(12) United States Patent
Tamura et al.

(10) Patent No.: US 12,341,877 B2
(45) Date of Patent: Jun. 24, 2025

(54) SECRET CALCULATION SYSTEM, SECRET CALCULATION METHOD, AND SECRET CALCULATION PROGRAM

(71) Applicant: Nomura Research Institute, Ltd., Tokyo (JP)

(72) Inventors: Koutarou Tamura, Tokyo (JP); Yasunori Hokazono, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 291 days.

(21) Appl. No.: 17/901,523

(22) Filed: Sep. 1, 2022

(65) Prior Publication Data
US 2023/0246824 A1    Aug. 3, 2023

(30) Foreign Application Priority Data
Feb. 2, 2022  (JP) .................................. 2022-015037

(51) Int. Cl.
*H04L 9/08* (2006.01)
*H04L 9/14* (2006.01)

(52) U.S. Cl.
CPC ................ *H04L 9/085* (2013.01); *H04L 9/14* (2013.01)

(58) Field of Classification Search
CPC . H04L 9/085; H04L 9/14; H04L 9/008; H04L 63/0428
See application file for complete search history.

(56) References Cited

U.S. PATENT DOCUMENTS

2022/0131689 A1* 4/2022 Ito .......................... H04L 9/0852
2023/0055992 A1* 2/2023 Vinayagamurthy ........................ G06F 21/6245

FOREIGN PATENT DOCUMENTS

| JP | 6722608 B2 | 7/2020 |
| WO | WO-2020211073 A1 * | 10/2020 |
| WO | WO-2021166277 A1 * | 8/2021 ........... H04L 9/0618 |

OTHER PUBLICATIONS

NPL.*

* cited by examiner

Primary Examiner — Mohammad W Reza
(74) Attorney, Agent, or Firm — RANKIN, HILL & CLARK LLP

(57) ABSTRACT

A secret calculation system includes an acquisition unit that acquires each of a plurality of pieces of processing target data indicating data encrypted using a plurality of pieces of different key information generated by a plurality of information processing systems, from a corresponding information terminal of a plurality of information terminals, a secret calculation unit that generates result data indicating a result of calculation based on the plurality of pieces of processing target data in a state where the plurality of pieces of processing target data are encrypted, and a providing unit that provides the result data to the plurality of information terminals.

15 Claims, 6 Drawing Sheets

FIG. 2

| PROCESSING TARGET DATA ID | PARAMETER INFORMATION | | | NUMBER-OF-DATA INFORMATION | | |
|---|---|---|---|---|---|---|
| | PARAMETER 1 | PARAMETER 2 | ... | NUMBER OF DATA PIECES 1 | NUMBER OF DATA PIECES 2 | ... |
| T0001 | 1.12 | 0.65 | ... | 1500 | 20 | ... |
| ... | ... | ... | ... | ... | ... | ... |

FIG. 3

| PROCESSING TARGET DATA ID | PARAMETER INFORMATION | | | NUMBER-OF-DATA INFORMATION | | |
|---|---|---|---|---|---|---|
| | PARAMETER 1 | PARAMETER 2 | ... | NUMBER OF DATA PIECES 1 | NUMBER OF DATA PIECES 2 | ... |
| T0001 | 0x779s··· | 0xf674··· | ··· | 0x8fgk··· | 0xcaky··· | ··· |
| ··· | ··· | ··· | ··· | ··· | ··· | ··· |

FIG. 4

| RESULT DATA ID | PARAMETER INFORMATION | | | NUMBER-OF-DATA INFORMATION | | |
|---|---|---|---|---|---|---|
| | PARAMETER 1 | PARAMETER 2 | ... | NUMBER OF DATA PIECES 1 | NUMBER OF DATA PIECES 2 | ... |
| R0001 | 0xk5di··· | 0xl2gf··· | ... | 0x45fw··· | 0x99sd··· | ... |
| ... | ... | ... | ... | ... | ... | ... |

SECRET CALCULATION SYSTEM, SECRET CALCULATION METHOD, AND SECRET CALCULATION PROGRAM

BACKGROUND OF THE INVENTION

1. Technical Field

The present invention relates to a secret calculation system, a secret calculation method, and a secret calculation program.

2. Description of the Related Art

Conventionally, there has been an increasing need for protection of privacy and confidential information, and there has been a demand for a technique for generating new data by performing secret calculation on encrypted data acquired from a plurality of information terminals in an encrypted state.

For example, in a secret calculation system described in JP 6722608 B2, a secret calculation server acquires data encrypted using a secret key shared by a data providing terminal and an aggregation terminal, aggregates the number of pieces of data for each ciphertext, and transmits an aggregation result to the aggregation terminal.

SUMMARY OF THE INVENTION

However, in JP 6722608 B2, since the secret key used for encryption is shared by the data providing terminal and the aggregation terminal, the encrypted data can be decrypted by the aggregation terminal, which is a security problem.

Therefore, an object of the present invention is to provide a secret calculation system, a secret calculation method, and a secret calculation program capable of more securely processing encrypted data of a plurality of information terminals.

A secret calculation system according to an aspect of the present invention includes an acquisition unit that acquires each of a plurality of pieces of processing target data indicating data encrypted using a plurality of pieces of different key information generated by a plurality of information processing systems, from a corresponding information terminal of a plurality of information terminals, a secret calculation unit that generates result data indicating a result of calculation based on the plurality of pieces of processing target data in a state where the plurality of pieces of processing target data are encrypted, and a providing unit that provides the result data to the plurality of information terminals.

A secret calculation method according to an aspect of the present invention is executed by a computer and includes: acquiring each of a plurality of pieces of processing target data indicating data encrypted using a plurality of pieces of different key information generated by a plurality of information processing systems, from a corresponding information terminal of a plurality of information terminals; generating result data indicating a result of calculation based on the plurality of pieces of processing target data in a state where the plurality of pieces of processing target data are encrypted; and providing the result data to the plurality of information terminals.

A secret calculation program according to an aspect of the present invention causes a computer to implement an acquisition unit that acquires each of a plurality of pieces of processing target data indicating data encrypted using a plurality of pieces of different key information generated by a plurality of information processing systems, from a corresponding information terminal of a plurality of information terminals, a secret calculation unit that generates result data indicating a result of calculation based on the plurality of pieces of processing target data in a state where the plurality of pieces of processing target data are encrypted, and a providing unit that provides the result data to the plurality of information terminals.

In the present invention, a "unit" does not simply mean a physical means, and includes a case where a function of the "unit" is realized by software. In addition, the functions of one "unit" or device may be implemented by two or more physical units or devices, or the functions of two or more "units" or devices may be implemented by one physical unit or device.

According to the present invention, it is possible to provide a secret calculation system, a secret calculation method, and a secret calculation program capable of more securely processing encrypted data of a plurality of information terminals.

BRIEF DESCRIPTION OF THE DRAWINGS

FIG. 2 is a diagram illustrating an example of information acquired by an acquisition unit;

FIG. 3 is a diagram illustrating an example of information stored in a processing target data storage unit;

FIG. 4 is a diagram illustrating an example of information stored in a result data storage unit;

DETAILED DESCRIPTION

Figure 1:
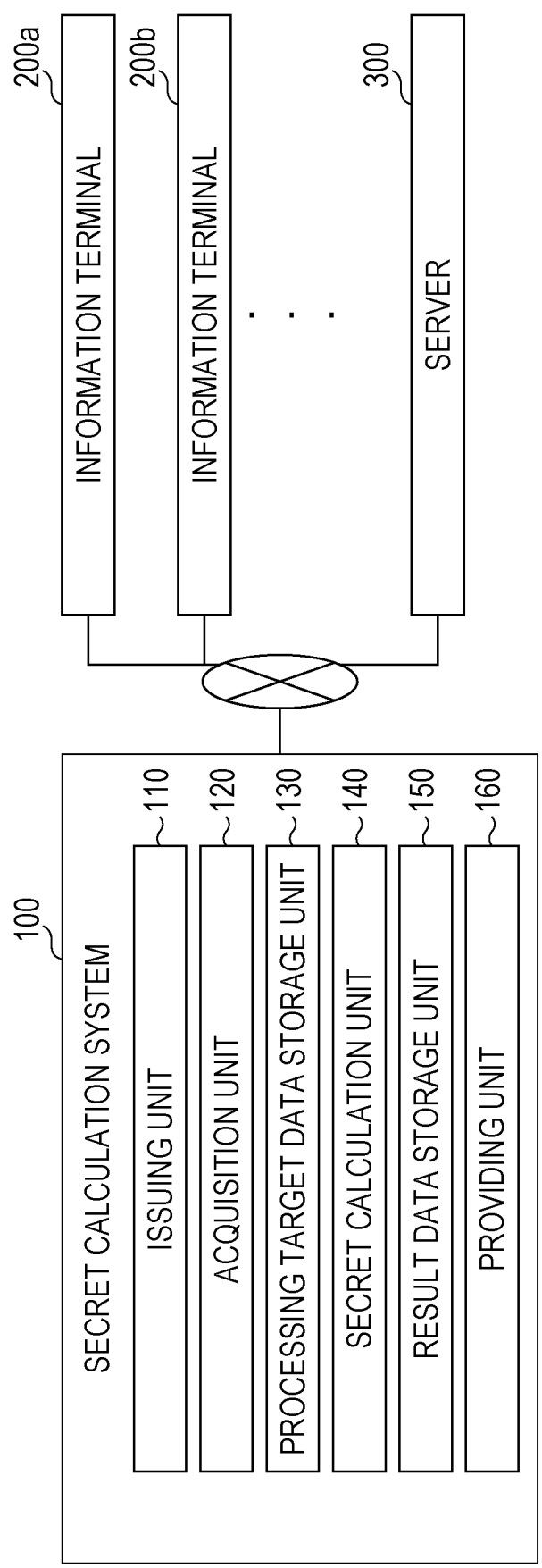
FIG. 1 is a diagram illustrating a configuration of a secret calculation system according to an embodiment of the present invention.

Preferred embodiments of the present invention will be described with reference to the accompanying drawings. FIG. 1 is a diagram illustrating a configuration of a secret calculation system 100 according to an embodiment of the present invention.

The secret calculation system 100 is a system communicably connected to an information terminal 200 (200a, 200b) and a server 300 via a network such as the Internet.

The secret calculation in the secret calculation system 100 is calculation in a state where data is concealed. In the secret calculation, for example, desired calculation processing based on data held by one or a plurality of organizations is executed without the data being disclosed to the organization or another organization at all. Furthermore, in the secret calculation, the calculation result is provided to one or a plurality of organizations or another organization holding the data in a concealed state. As described above, in the secret calculation system 100, the security of the data used for calculation and the calculation processing is improved by the secret calculation, and the predetermined calculation is executed.

The secret calculation system 100 acquires the encrypted data (processing target data), performs secret calculation based on the plurality of pieces of processing target data in a state where the processing target data is encrypted, and generates new data (result data). Specifically, the secret calculation system 100 acquires a plurality of pieces of processing target data encrypted using a plurality of pieces of different key information generated by a plurality of information processing systems, and generates result data indicating a calculation result based on the plurality of pieces of processing target data in an encrypted state.

In addition, the secret calculation system 100 can acquire each of the plurality of pieces of processing target data obtained by encrypting parameter information indicating a parameter in a predetermined learning model from the corresponding information terminal among the plurality of information terminals. Then, the secret calculation system 100 can generate new parameter information based on the plurality of pieces of parameter information in a state where the plurality of pieces of processing target data are encrypted. Details of the secret calculation system 100 will be described later.

The information terminal 200 acquires a plurality of pieces of different key information generated by a plurality of information processing systems, encrypts data using the plurality of pieces of different key information, and provides the encrypted processing target data to the secret calculation system 100. The information terminal 200 is, for example, an information terminal of a user who uses the secret calculation system 100.

The information terminal 200 can acquire the key information from an arbitrary information processing system. That is, the information terminal 200 can acquire different key information from, for example, the secret calculation system 100 and the server 300 to be described later. In this case, for example, the information terminal 200 may transmit the use request information requesting use of the secret calculation system 100 to the secret calculation system 100 or the server 300, and acquire different key information issued from the secret calculation system 100 and the server 300 according to the use request information.

Note that, although FIG. 1 illustrates two information terminals 200a and 200b as examples of the information terminal 200, the number of information terminals 200 is not limited thereto.

The server 300 generates key information used for encryption by the information terminal 200 and provides the key information to the information terminal 200.

In a case where the secret calculation system 100 processes the parameter information indicating the parameter in the predetermined learning model by secret calculation, the server 300 may be a server that manages the predetermined learning model. In this case, when receiving the parameter information from the information terminal 200, the server 300 may update the learning model according to the parameter information to generate a new learning model, and provide information regarding the new learning model to the information terminal 200.

Next, details of the secret calculation system 100 will be described. The secret calculation system 100 includes an issuing unit 110, an acquisition unit 120, a processing target data storage unit 130, a secret calculation unit 140, a result data storage unit 150, and a providing unit 160. The computer constituting the secret calculation system 100 includes a processor and a storage area. Each unit illustrated in FIG. 1 can be implemented, for example, using a storage area or by executing a program stored in the storage area by a processor.

The issuing unit 110 generates at least one piece of key information and issues the key information to the information terminal 200. Here, the key information may be information used for encryption and decryption at the time of secret calculation, such as a secret key, a public key, and a password, and the encryption method is not limited. Further, the key information may be one-time key information issued each time data is encrypted.

The information terminal 200 encrypts data using key information issued from the issuing unit 110 and key information issued from an information processing system (for example, the server 300) different from the secret calculation system 100.

Here, the key information issued from the issuing unit 110 and the key information issued from an information processing system (for example, the server 300) different from the secret calculation system 100 are different key information. As a result, the encrypted processing target data cannot be decrypted in either of the secret calculation system 100 and the information processing system (for example, the server 300) different from the secret calculation system 100, and the confidentiality of the processing target data is maintained.

Note that the information terminal 200 only needs to encrypt the processing target data using a plurality of pieces of different key information generated by a plurality of information processing systems, and the key information used for encryption may not be the key information generated by the secret calculation system 100 or the server 300.

The acquisition unit 120 acquires each of a plurality of pieces of processing target data indicating data encrypted using a plurality of pieces of different key information generated by a plurality of information processing systems (for example, the secret calculation system 100 and the server 300) from a corresponding information terminal among a plurality of information terminals, and stores the processing target data in the processing target data storage unit 130.

The acquisition unit 120 can acquire processing target data obtained by encrypting parameter information indicating a parameter in a predetermined learning model. In addition, the acquisition unit 120 can acquire processing target data obtained by encrypting number-of-data information indicating the number of pieces of data corresponding to the parameter information.

Here, the parameter information is information regarding a property and an output result of a predetermined learning model, and is, for example, information indicating an error of a result predicted based on the learning model. In addition, the number-of-data information is information indicating the number of pieces of data (so-called teacher data) learned in learning using a predetermined learning model. More specifically, for example, in a case where the predetermined learning model is a learning model that predicts one of two predetermined states based on input data, the parameter information is a parameter corresponding to the two states for predicting one of the two states based on input data, and the number-of-data information is information indicating the number of teacher data pieces corresponding to each of the two states.

Note that the processing target data only needs to be encrypted using a plurality of pieces of different key information generated by a plurality of information processing systems, and the key information used for encryption may not be the key information generated by the secret calculation system 100 or the server 300.

FIG. 2 is a diagram illustrating an example of information acquired by the acquisition unit 120. In FIG. 2, for convenience, data is illustrated in an unencrypted state. The information acquired by the acquisition unit 120 includes, for example, a processing target data ID, parameter information, and number-of-data information.

The processing target data ID is processing target data identification information for identifying processing target data for which secret calculation is performed by the secret calculation system 100. The parameter information and the number-of-data information may include a plurality of pieces of corresponding parameter information and number-of-data information.

FIG. 3 is a diagram illustrating an example of information stored in the processing target data storage unit 130. The information stored in the processing target data storage unit 130 includes, for example, a processing target data ID, parameter information, and number-of-data information. All or part of the information stored in the processing target data storage unit 130 (for example, the parameter information and the number-of-data information) is encrypted using a plurality of pieces of key information.

Note that the information stored in the processing target data storage unit 130 may not include the parameter information and the number-of-data information, and may include data used for predetermined secret calculation in the secret calculation system 100.

The secret calculation unit 140 generates result data indicating a result of calculation based on the plurality of pieces of processing target data in a state where the plurality of pieces of processing target data are encrypted, and stores the result data in the result data storage unit 150.

In a case where the secret calculation system 100 processes the parameter information in the predetermined learning model by secret calculation, the secret calculation unit 140 can generate, by secret calculation, result data in which an average value of a plurality of pieces of parameter information is set as new parameter information based on a plurality of pieces of parameter information, for example. As a result, the parameter information generated by the plurality of information terminals 200 can be integrated to generate new parameter information.

Furthermore, in a case where the secret calculation system 100 processes the parameter information in the predetermined learning model by secret calculation, the secret calculation unit 140 can generate, by secret calculation, result data in which a value calculated by weighting based on the number-of-data information is set as new parameter information based on a plurality of pieces of parameter information and number-of-data information, for example. As a result, it is possible to generate new parameter information in consideration of the weighting of the number-of-data information.

Furthermore, in a case where the secret calculation system 100 processes the parameter information in the learning model for predicting one of the two predetermined states based on the input data by secret calculation, the secret calculation unit 140 can generate, for example, result data in which a value calculated by weighting the parameter information of one of the two predetermined states based on the number-of-data information of the other of the two predetermined states is set as new parameter information by the secret calculation. As a result, even in a case where the occurrence rate of one of the two predetermined states is lower than that of the other state, it is possible to generate new parameter information for generating a learning model with high prediction accuracy.

FIG. 4 is a diagram illustrating an example of information stored in a result data storage unit 150. The information stored in the result data storage unit 150 includes, for example, a result data ID, parameter information, and number-of-data information. All or part of the information stored in the result data storage unit 150 (for example, the parameter information and the number-of-data information) are encrypted using a plurality of pieces of key information.

Note that the information stored in the result data storage unit 150 may not include the parameter information and the number-of-data information, and may include data generated by predetermined secret calculation in the secret calculation system 100.

The providing unit 160 provides the result data to the plurality of information terminals 200.

The information terminal 200 decrypts the result data provided from the providing unit 160 using the plurality of pieces of key information used for encryption, and acquires the decrypted result data. As a result, the information terminal 200 can acquire the result of the secret calculation in the secret calculation system 100.

Then, the information terminal 200 provides the decrypted result data to the server 300. As a result, the information terminal 200 can update the predetermined learning model in the server 300 using the new parameter information corresponding to the result data.

Note that the information terminal 200 may provide the result data to the server 300 in a state where the result data is encrypted. In this case, the information terminal 200 may provide the result data in an encrypted state using only the key information acquired from the server 300. As a result, the information processing system other than the server 300 cannot decrypt the encrypted result data, but the server 300 can decrypt the encrypted result data, so that security of the result data is maintained.

Next, a specific application example of the secret calculation system 100 will be described. The secret calculation system 100 can be applied to, for example, generation of parameter information in a learning model common to a plurality of manufacturers used for quality inspection at the time of manufacturing a product.

Here, in the learning model common to a plurality of manufacturers used for quality control at the time of manufacturing a product, for example, an image of the product is input, and the quality of the product is predicted in one of two states of normal and abnormal based on an item common to the plurality of manufacturers.

Since a plurality of manufacturers are in a business competitive relationship, it is difficult to share parameter information of a learning model used for quality inspection and data (for example, image data of a product, and the like) serving as a source of the parameter information among the plurality of manufacturers. In addition, in a case where the occurrence rate of a product determined to be abnormal is low, there is a possibility that a learning model with high prediction accuracy is not generated only with data of one manufacturer.

Therefore, application of the secret calculation system 100 is effective. That is, by applying the secret calculation system 100 to learning of a learning model used for quality inspection at the time of manufacturing a product, it is possible to secure data of a sufficient number of data pieces for generating a learning model with high prediction accuracy while concealing the parameter information and the number-of-data information. In addition, it is possible to generate new parameter information by performing appropriate weighting based on the number-of-data information as necessary.

In a case where the secret calculation system 100 is applied to learning of a learning model common to a plurality of manufacturers used for quality inspection at the time of manufacturing a product, the information terminal 200 is an information terminal used by a plurality of manufacturers, and the server 300 is a server that manages the learning model.

Each of the plurality of information terminals 200 provides the processing target data obtained by encrypting the parameter information and the number-of-data information corresponding to the state (normal state and abnormal state) of the product to the secret calculation system 100. The secret calculation system 100 performs predetermined secret calculation and provides the result data to each of the plurality of information terminals 200. Each of the plurality of information terminals 200 decrypts the result data and provides the result data to the server 300. The server 300 updates the learning model based on the result data and provides information regarding the new learning model to each of the plurality of information terminals 200.

As a result, each of the plurality of information terminals 200 can more safely acquire the learning model learned based on the data pieces of the plurality of manufacturers while concealing the processing target data, and can perform the quality inspection with higher accuracy.

Figure 5:
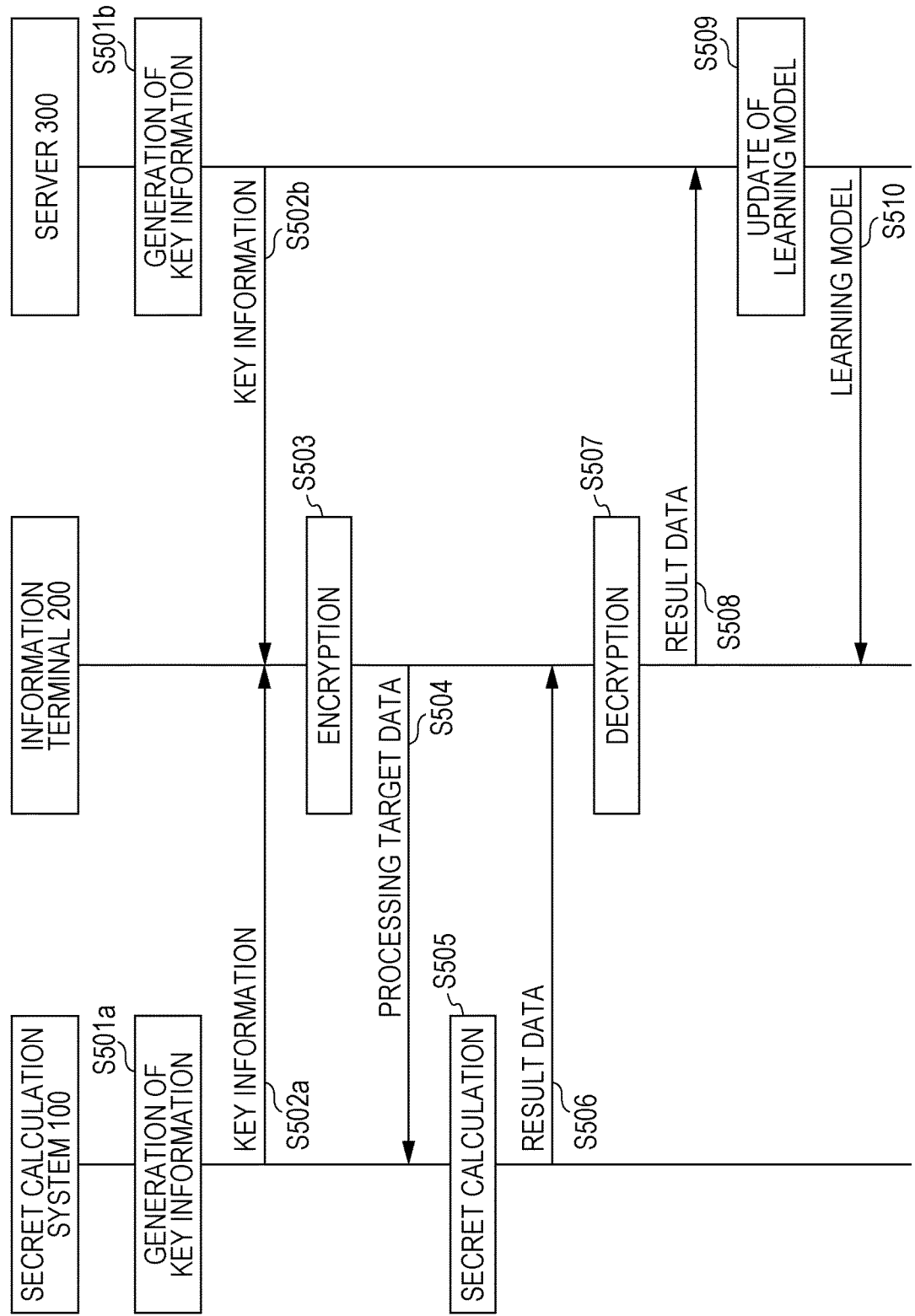
FIG. 5 is a sequence chart illustrating an example of processing in the secret calculation system.

FIG. 5 is a sequence chart illustrating an example of processing in the secret calculation system 100.

First, the issuing unit 110 generates key information (S501a) and issues the key information to the information terminal 200 (S502a). In addition, an information processing system (for example, the server 300) different from the secret calculation system 100 generates different key information (S501b) and issues the generated key information to the information terminal 200 (S502b). The information terminal 200 encrypts data based on the key information issued from the issuing unit 110 and the server 300 (S503).

Note that the information terminal 200 only needs to encrypt the processing target data using a plurality of pieces of different key information generated by a plurality of information processing systems, and the key information used for encryption may not be the key information generated by the secret calculation system 100 or the server 300.

Subsequently, the information terminal 200 provides the encrypted processing target data to the secret calculation system 100, and the acquisition unit 120 acquires the processing target data and stores the processing target data in the processing target data storage unit 130 (S504). The secret calculation unit 140 performs secret calculation based on the processing target data in a state where the processing target data is encrypted, generates result data indicating a result of the secret calculation, and stores the result data in the result data storage unit 150 (S505). Then, the providing unit 160 provides the result data to the information terminal 200 (S506).

The information terminal 200 decrypts the result data using the key information used for encryption (S507), and provides the decrypted result data to the server 300 (S508). Note that the information terminal 200 may provide the result data in a state where encryption that can be decrypted by the server 300 is performed.

The server 300 updates the learning model based on the result data (S509) and provides the updated learning model to the information terminal 200 (S510).

Figure 6:
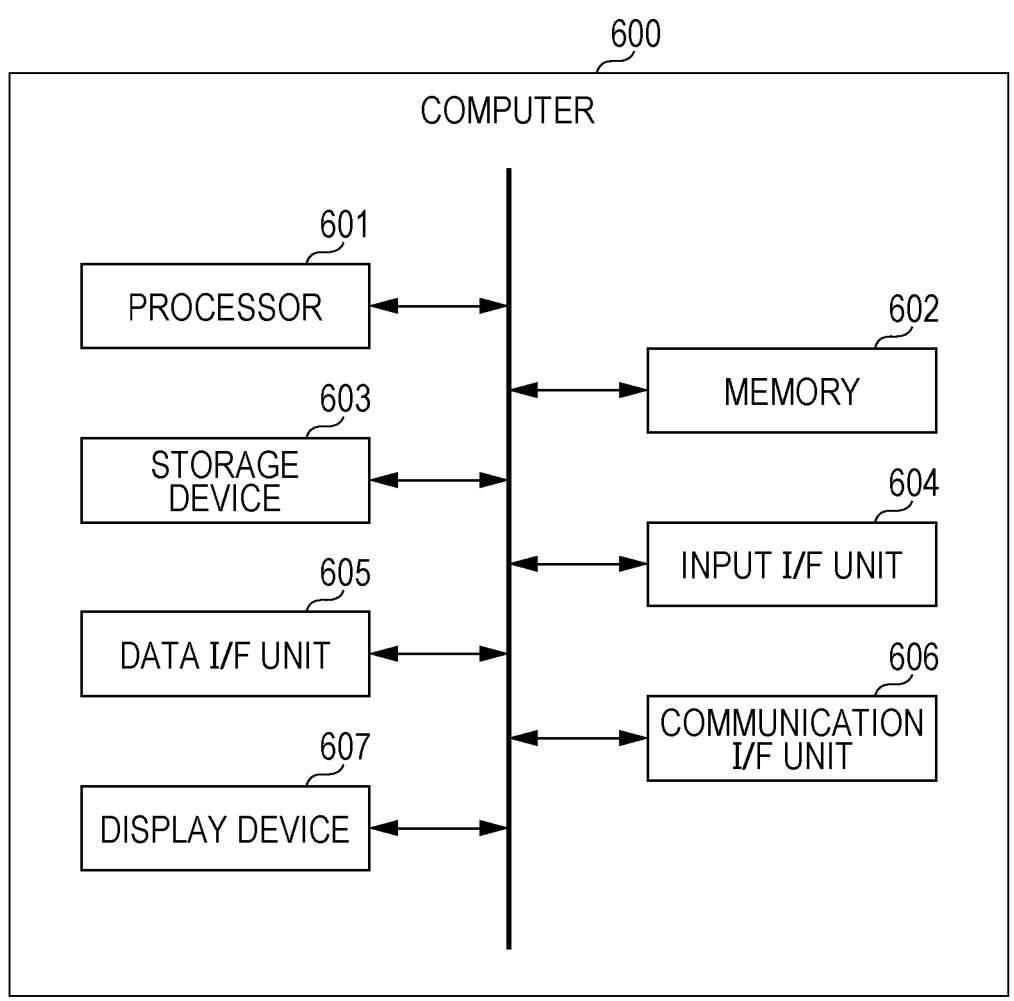
FIG. 6 is a diagram illustrating an example of a hardware configuration of a computer.

Next, an example of a hardware configuration in a case where the secret calculation system 100 is implemented by the computer 600 will be described with reference to FIG. 6. FIG. 6 is a diagram illustrating an example of a hardware configuration of a computer 600.

As illustrated in FIG. 6, the computer 600 includes, for example, a processor 601, a memory 602, a storage device 603, an input I/F unit 604, a data I/F unit 605, a communication I/F unit 606, and a display device 607.

The computer 600 may be, for example, a server computer, a personal computer (for example, a desktop, a laptop, a tablet, or the like), a media computer platform (for example, a cable, a satellite set-top box, a digital video recorder, or the like), a handheld computer device (for example, a PDA, an e-mail client, or the like), or another type of computer or communication platform.

The processor 601 is a control unit that executes a program stored in the memory 602 to control various types of processing in the computer 600.

The memory 602 is a storage medium such as a random access memory (RAM) The memory 602 temporarily stores a program code of the program executed by the processor 601 and data required when the program is executed.

The storage device 603 is a nonvolatile storage medium such as a hard disk drive (HDD) or a flash memory. The storage device 603 stores an operating system and various programs for realizing the above-described configurations.

The input I/F unit 604 is a device for receiving an input from the user. The input I/F unit 604 is, for example, a keyboard, a mouse, a touch panel, various sensors, a wearable device, or the like. The input I/F unit 604 may be connected to the computer 600 via an interface such as a universal serial bus (USB).

The data I/F unit 605 is a device for inputting data from the outside of the computer 600. The data I/F unit 605 is, for example, a drive device or the like for reading data stored in various storage media. The data I/F unit 605 may be provided outside the computer 600. In a case where the data I/F unit 605 is provided outside the computer 600, the data I/F unit 605 is connected to the computer 600 via an interface such as USB, for example.

The communication I/F unit 606 is a device for performing data communication with a device outside the computer 600 via the network such as the Internet by wired or wireless means. The communication I/F unit 606 may be provided outside the computer 600. In a case where the communication I/F unit 606 is provided outside the computer 600, the communication I/F unit 606 is connected to the computer 600 via an interface such as USB, for example.

The display device 607 is a device for displaying various types of information. The display device 607 include, for example, a liquid crystal display, an organic electro-luminescence (EL) display, and a wearable device display. The display device 607 may be provided outside the computer 600. In a case where the display device 607 is provided outside the computer 600, the display device 607 is connected to the computer 600 via, for example, a display cable or the like. In addition, in a case where a touch panel is employed as the input I/F unit 604, the display device 607 may be integrated with the input I/F unit 604.

The embodiment of the present invention has been described above. The secret calculation system 100 can acquire each of a plurality of pieces of processing target data indicating data encrypted using a plurality of pieces of different key information generated by a plurality of information processing systems, from a corresponding information terminal among a plurality of information terminals, generate result data indicating a result of secret calculation based on the processing target data in a state where the processing target data is encrypted, and provide the result data to the information terminal 200. As a result, it is possible to process the encrypted data of the plurality of information terminals more safely.

The secret calculation system 100 can issue at least one piece of key information of a plurality of pieces of different key information to the information terminal 200. As a result, the secret calculation system 100 can serve as both an issuing entity of the key information and an execution entity of the secret calculation, and can process the encrypted data of the plurality of information terminals more safely.

Furthermore, the secret calculation system 100 can generate and provide result data (that is, new parameter information) by secret calculation based on processing target data obtained by encrypting parameter information indicating a parameter in a predetermined learning model. As a result, it is possible to perform new learning processing by integrating the learning results of the plurality of information terminals more safely.

Furthermore, the secret calculation system 100 can generate the result data (that is, new parameter information) by weighting the parameter information performed based on the number-of-data information corresponding to the parameter information. As a result, it is possible to perform new learning processing by integrating the learning results of the plurality of information terminals more safely in consideration of the number-of-data information.

Furthermore, in a case where the predetermined learning model is a learning model that predicts one of two predetermined states based on input data, the secret calculation system 100 can generate the result data (that is, new parameter information) by weighting the parameter information of one of the two predetermined states based on the number-of-data information of the other of the two predetermined states. As a result, even in a case where the occurrence rate of one of the predetermined two states is low, it is possible to perform new learning processing by integrating the learning results of the plurality of information terminals more safely and more effectively.

Note that, the present embodiments are for facilitating understanding of the present invention and are not intended to limit the present invention. The present invention can be modified/improved without departing from the spirit of the invention, and equivalents thereof are also included in the present invention.

What is claimed is:

1. A secret calculation system comprising: an acquisition unit that acquires each one of a plurality of pieces of processing target data from each one of a plurality of information terminals, wherein each one of the plurality of pieces of processing target data is encrypted using a plurality of pieces of different key information each generated by different one of a plurality of information processing systems;
a secret calculation unit that generates result data indicating a result of calculation based on the plurality of pieces of processing target data in a state where the plurality of pieces of processing target data are encrypted wherein the plurality of information processing systems include the secret calculation system and a server communicably connected to the secret calculation system via a network and each one of the plurality of pieces of processing target data is encrypted using each one of first keys issued by the secret calculation system and each one of second keys which are different from the first keys and issued by the server; and
a providing unit that provides the result data to the plurality of information terminals.

2. The secret calculation system according to claim 1, further comprising: an issuing unit that generates at least one piece of key information among the plurality of pieces of different key information, and issues the key information to the plurality of information terminals.

3. The secret calculation system according to claim 1, wherein
the acquisition unit acquires the plurality of pieces of processing target data including parameter information indicating a parameter in a predetermined learning model, and
the secret calculation unit generates the result data indicating a new parameter information based on the parameter information.

4. The secret calculation system according to claim 3, wherein
each of the plurality of pieces of processing target data further includes number-of-data information indicating the number of pieces of data corresponding to the parameter information generated using the predetermined learning model, and
the secret calculation unit generates the result data by weighting the parameter information performed based on the number-of-data information.

5. The secret calculation system according to claim 4, wherein
the predetermined learning model predicts one of two predetermined states based on input data,
the parameter information is a parameter corresponding to each of the two predetermined states, and
the secret calculation unit generates the result data by weighting parameter information of one of the two predetermined states based on number-of-data information of the other of the two predetermined states.

6. The secret calculation system according to claim 2, wherein
the acquisition unit acquires the plurality of pieces of processing target data including parameter information indicating a parameter in a predetermined learning model, and
the secret calculation unit generates the result data indicating a new parameter information based on the parameter information.

7. The secret calculation system according to claim 6, wherein
each of the plurality of pieces of processing target data further includes number-of-data information indicating the number of pieces of data corresponding to the parameter information generated using the predetermined learning model, and
the secret calculation unit generates the result data by weighting the parameter information performed based on the number-of-data information.

8. The secret calculation system according to claim 7, wherein
the predetermined learning model predicts one of two predetermined states based on input data,
the parameter information is a parameter corresponding to each of the two predetermined states, and
the secret calculation unit generates the result data by weighting parameter information of one of the two predetermined states based on number-of-data information of the other of the two predetermined states.

9. The secret calculation system according to claim 1, wherein the server manages a predetermined learning model, the plurality of pieces of processing target data include parameter information indicating a parameter in the predetermined learning model, and the secret calculation unit generates the result data indicating a new parameter information based on the parameter information.

10. A system comprising:

the secret calculation system according to claim 1;

the plurality of information terminals communicably connected to the secret calculation system via a network; and a server communicably connected to the secret calculation system and the plurality of information terminals via the network, wherein the each one of the plurality of pieces of processing target data is encrypted using each one of first keys issued by the secret calculation system and each one of second keys which are different from the first keys and issued by the server.

11. The system according to claim 10, wherein one of the plurality of information terminals provides the result data to the server in an encrypted state using only one of the second keys issued by the server.

12. A secret calculation method executed by a computer, the method comprising:

acquiring each one of a plurality of pieces of processing target data from each one of a plurality of information terminals, wherein each one of the plurality of pieces of processing target data is encrypted using a plurality of pieces of different key information each generated by different one of a plurality of information processing systems;

generating result data indicating a result of calculation based on the plurality of pieces of processing target data in a state where the plurality of pieces of processing target data are encrypted, wherein the plurality of information processing systems include a secret calculation system that performs the calculation based on the plurality of pieces of processing target data in a state where the plurality of pieces of processing target data are encrypted and a server communicably connected to the secret calculation system via a network, and each one of the plurality of pieces of processing target data is encrypted using each one of first keys issued by the secret calculation system and each one of second keys which are different from the first keys and issued by the server; and providing the result data to the plurality of information terminals.

13. The secret calculation method according to claim 12, wherein the server manages a predetermined learning model, the plurality of pieces of processing target data include parameter information indicating a parameter in the predetermined learning model, and the generated result data indicate a new parameter information based on the parameter information.

14. A non-transitory computer-readable medium storing a secret calculation program for causing a computer to implement:

an acquisition unit that acquires each one of a plurality of pieces of processing target data from each one of a plurality of information terminals, wherein each one of the plurality of pieces of processing target data is encrypted using a plurality of pieces of different key information each generated by different one of a plurality of information processing systems;

a secret calculation unit that generates result data indicating a result of calculation based on the plurality of pieces of processing target data in a state where the plurality of pieces of processing target data are encrypted wherein the plurality of information processing systems include a secret calculation system that includes the secret calculation unit and a server communicably connected to the secret calculation system via a network, and each one of the plurality of pieces of processing target data is encrypted using each one of first keys issued by the secret calculation system and each one of second keys which are different from the first keys and issued by the server; and a providing unit that provides the result data to the plurality of information terminals.

15. The non-transitory computer-readable medium according to claim 14, wherein the server manages a predetermined learning model, the plurality of pieces of processing target data include parameter information indicating a parameter in the predetermined learning model, and the secret calculation unit generates the result data indicating a new parameter.

* * * * *